INVENTOR.
Frank M. Lefief
BY Howard G. Russell
his ATTORNEY

INVENTOR.
Frank M. Lefief
BY
Howard G. Russell
his ATTORNEY

INVENTOR.
Frank M. Lefief
BY Howard G. Russell
his ATTORNEY

May 9, 1967 F. M. LEFIEF 3,318,205
HORIZONTAL BOX FORMERS

Filed Nov. 10, 1964 17 Sheets-Sheet 13

INVENTOR.
Frank M. Lefief
BY Howard G. Russell
his ATTORNEY

INVENTOR.
Frank M. Lefief
BY
Howard S. Russell
his ATTORNEY

May 9, 1967 F. M. LEFIEF 3,318,205
HORIZONTAL BOX FORMERS
Filed Nov. 10, 1964 17 Sheets-Sheet 15

INVENTOR.
Frank M. Lefief
BY
Howard G. Russell
ATTORNEY

United States Patent Office 3,318,205
Patented May 9, 1967

3,318,205
HORIZONTAL BOX FORMERS
Frank M. Lefief, Palo Alto, Calif., assignor, by mesne assignments, to Kliklok Corporation, New York, N.Y., a corporation of Delaware
Filed Nov. 10, 1964, Ser. No. 410,097
15 Claims. (Cl. 93—51)

This invention relates to improvements in folding box forming machines of the general type in which a substantially horizontally reciprocated plunger pushes an initially flat box blank through an open-ended forming die in order to form the blank into box shape.

Machines of this general type may be divided into two sub-classes comprising, firstly, those machines in which the folded blank is locked in box form by self-locking means on the blank which are brought into engagement by the action of the plunger and the die and, secondly, those machines which employ adhesive with or without the simultaneous application of heat in order to form an adhesive bond between overlapping portions of the box structure.

The present invention provides structural features which are equally useful in the forming of interlocked boxes as they are in the forming of glued boxes, and the machine described in detail further below permits a ready exchange of a plunger and die for forming glued boxes for a plunger and die for forming gluelessly interlocked boxes. Certain elements which aid in the folding and guiding of portions of blanks to be gluelessly interlocked serve a double or triple function in the version of the machine in which adhesive is applied.

In the forming of large, particularly of deep boxes, a substantial plunger travel is required. If the plunger were to move vertically, as it does in conventional machines, the height of the machine becomes so great as to produce difficulties both in the supplying of box blanks to the blank magazine and in the removal of boxes.

Speaking first of the supply of blanks, the loading of a magazine mounted at a level higher than can conveniently be reached by a person of normal size standing next to the machine is troublesome, particularly since a stack of large blanks represents a substantial weight.

Referring next to the removal of formed boxes from the machine, it is undesirable to have them delivered at a level below the normal height of a conveyor line on which the box is to travel for filling and closing. A box may of course be lifted to this level, if delivered by the machine at a lower level. But this complicates the line, the timing and spacing of boxes traveling on the line and adds to the length of the total installation which comprises the box former and a filling and closing line.

As will be seen from the following detailed description, the improved machine embodying the present invention may be supplied with blanks at a convenient level, yet the formed boxes are delivered, properly spaced and timed, onto a filling conveyor line without any lifting devices and this is accomplished with relatively large boxes of half-gallon or two-liter capacity, respectively.

The machine operates with utmost precision as the position, feeding and forming of the blanks is positively controlled all along the path of travel from the magazine stack to the box delivery station so as to exclude the accidental formation of misshapen boxes which would result from inaccurate positioning or alignment at any of the various stations through which the blank passes.

In spite of all these operational features the machine is of relatively simple construction with ready access to all its blank handling portions, more particularly the blank feeder, the plunger, the die, the box removal mechanism and the adhesive applicator, assuming the functions of the latter are required for producing a glued box.

The various aims, objects and advantages of the invention will appear more fully from a consideration of the following description accompanied by drawings showing, for the purpose of illustration, a preferred embodiment of the invention. The invention also resides in certain new and original features of construction and combination of elements hereinafter set forth and claimed.

Although the characteristic features of the invention which are believed to be novel will be particularly pointed out in the claims appended hereto, the invention itself, its objects and advantages, and the manner in which it may be carried out may be better understood by referring to the following description taken in connection with the accompanying drawings forming a part of it in which:

Figure 1:
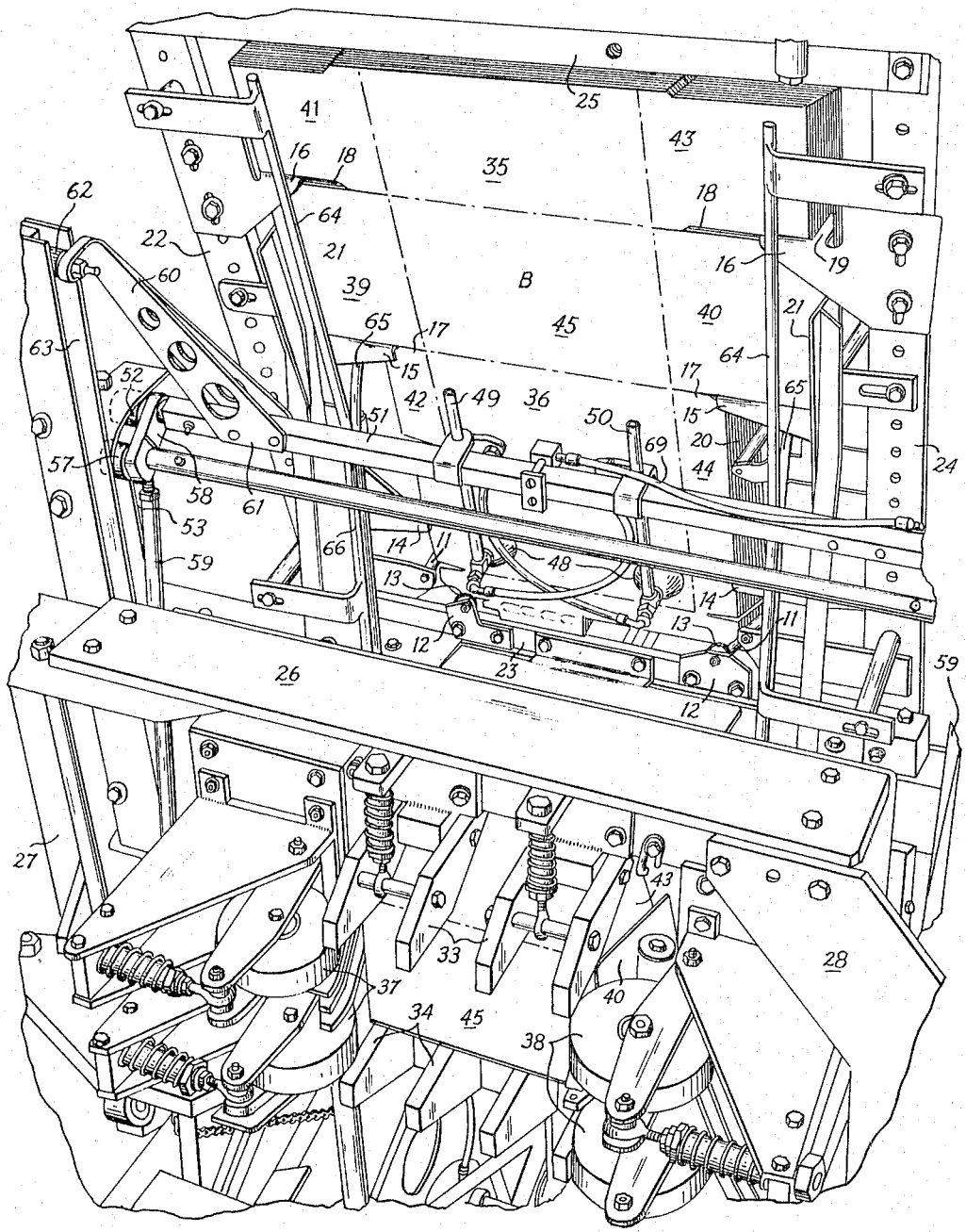
FIG. 1 is a perspective view of the blank feeding and forming portions of a box forming machine embodying the present invention.
Figure 2:
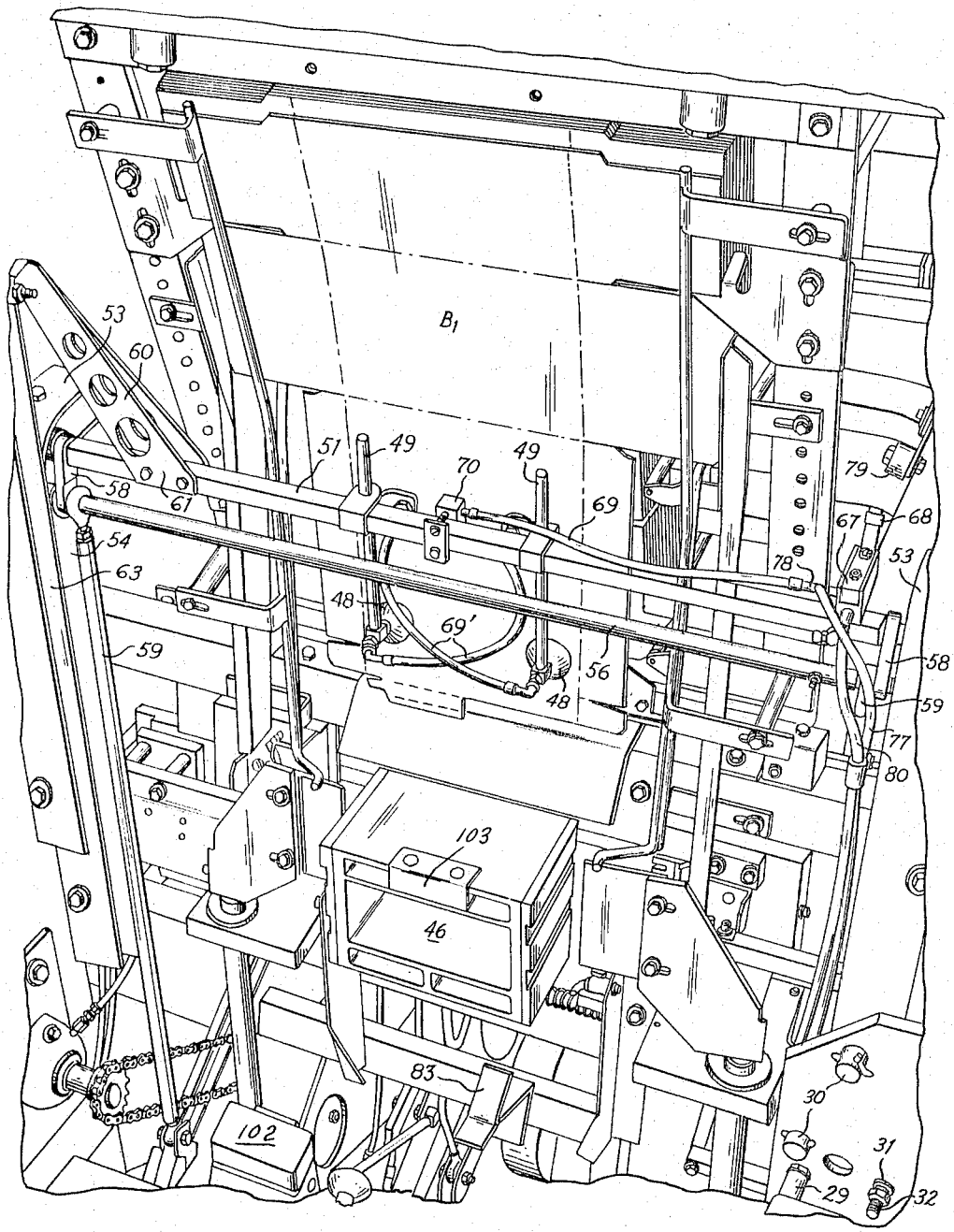
FIGS. 2, 3 and 4 are views of the blank feeding mechanism in successive positions of its feed stroke, the box forming mechanism of FIG. 1 being swung out of the way to expose the feeder fully.

In the following description and in the claims various details will be identified by specific names for convenience. The names, however, are intended to be generic in their application. Corresponding reference characters refer to corresponding parts in the several figures of the drawings.

The drawings accompanying, and forming part of, this specification disclose certain specific details of construction for the purpose of explanation of broader aspects of the invention, but it should be understood that structural details may be modified in various respects without departure from the principles of the invention, and that the invention may be incorporated in other structural forms than shown.

A supply of flat folding box blanks B is stored in a blank magazine for withdrawal of the blanks, one at a time, by a blank feeder or transport device.

Referring to FIG. 1, a stack of flat folding box blanks B rests on edge on a pair of rearwardly extending and slightly upwardly inclined supporting rods 11 of which only the right rod is visible. The front ends of the rods rest in mounting brackets 12, and discs or washers 13 of a diameter somewhat larger than the diameter of the rods 11 form blank retainers which prevent the foremost blank from falling out of the magazine under the pressure of the stack behind it, yet permit withdrawal of individual blanks by the blank feeder about to be described. When being withdrawn, the foremost blank flexes slightly when being pulled past the obstructions 13.

Other blank retaining elements are lateral fingers 14 and, at still higher levels, aligning brackets 15 and 16, all of which marginally overlap the foremost blank.

The aligning brackets 15 and 16 comprise horizontal shoulders extending into slits or notches 17, 18 of the blanks, one such shoulder being visible at 19.

Further lateral aligning means include lateral aligning rods 20 (only the right rod being visible) and aligning plates 21.

All these aligning means serve to maintain the blanks in a very accurately defined position at the magazine gate which comprises a substantially rectangular framework 22, 23, 24 and 25 to which the several aligning and blank retaining elements are secured. The magazine gate is slightly forwardly inclined and its plane forms an acute angle with respect to the vertical plane. The magazine gate represents the withdrawal station at which the blanks are removed, one by one, by the feeder and transported to a lower deposit station located in the present embodiment in front of a box forming die of basically known design.

The die comprises a heavy framework 26 hingedly mounted on a vertical hinge axis 27 to permit the die to be swung out of the way, thereby exposing the deposit station of the feeder proper (FIGS. 2 to 5).

Opposite the die hinge 27 a heavy yoke 28 serves to lock the die in operative position (FIG. 1) by means of a quick release clamping device 29.

When locked the yoke 28 bears against studs 30 on the machine frame and also bears against the plunger of a microswitch 31 which, when depressed, permits the machine to be operated, but which, when open, interrupts the electrical circuit of the drive.

In order to take the sequential photographs on which FIGS. 2 to 5 are based, it was necessary to actuate the switch 31 by an adjustable screw stud 32 (FIG. 2) on the clamping device 29 to make up for the thickness of the yoke.

The folding die comprises cam devices 33, 34 for folding the side walls 35, 36 of the blank and end rollers 37, 38 for folding the box ends, the latter being composed of outer end panels 39, 40 and inner end panels of which panels 41, 42 are on the left and panels 43, 44 are on the right. The central bottom panel 45 is engaged on its back side by the box forming plunger (FIG. 2) later referred to.

The blank feeder comprises a pair of vacuum or suction cups 48 mounted on arms 49, 50 on a square transverse bar 51. The square bar 51 is fitted with rollers 52 at its extreme ends. The rollers run in vertically extended tracks 53 (only the left track being visible), the lower portion 54 of the track being straight and substantially vertical, the upper portion 55 being curved toward the magazine gate (best seen in FIG. 4).

A round bar 56 extends parallel to the square bar and is also fitted with rollers 57 at its extreme ends running in the same tracks 53 on both sides of the magazine. The bars 51 and 56 are connected by links 58. The assembly of bars 51, 56 and links 58 may be considered a carriage running in the tracks 53 adapted, by reason of its articulated construction, to follow the track curvature.

The carriage 51, 56, 58 is moved up and down the track 53 by push rods 59.

It is apparent that the attitude of the vacuum cups 48 may be changed by tilting the square bar 51. Since, further, the cups 48 are mounted on arms, tilting of the bar 51 produces a motion of the cups 48 toward, and away from, the magazine gate.

This is accomplished conveniently in the illustrated embodiment by a control or tilt arm 60 secured to the square bar at 61 and fitted at its end with a roller 62 running in a further vertical track 63.

When the feeder carriage 51, 56, 58 enters the curved track portion 55, the roller 62 of the control arm 60 continuing in its vertical track 63 causes the bar 51 to tilt in a direction to move the vacuum cups 48 toward the magazine gate. Conversely, downward movement of the feeder carriage causes the bar 51 to be tilted in the opposite sense and the vacuum cups to be withdrawn from the magazine gate (compare FIGS. 1 and 2).

Forward guide rods 64 and rear guide rods 65 define a substantially vertical gap or passageway 66 between them for guiding the extreme lateral portions of a blank grasped by the cups 48 of the downwardly moving carriage 51, 56, 58.

The feeder carriage further carries a vent valve 67 comprising a rearwardly extending arm 68. When lifted the arm 68 uncovers a vent port (not visible) to the atmosphere and relieves the vacuum in a vacuum line 69 extending to a Y-connection 70 from which two branch ducts 69' lead to the cups 48.

Figure 7:
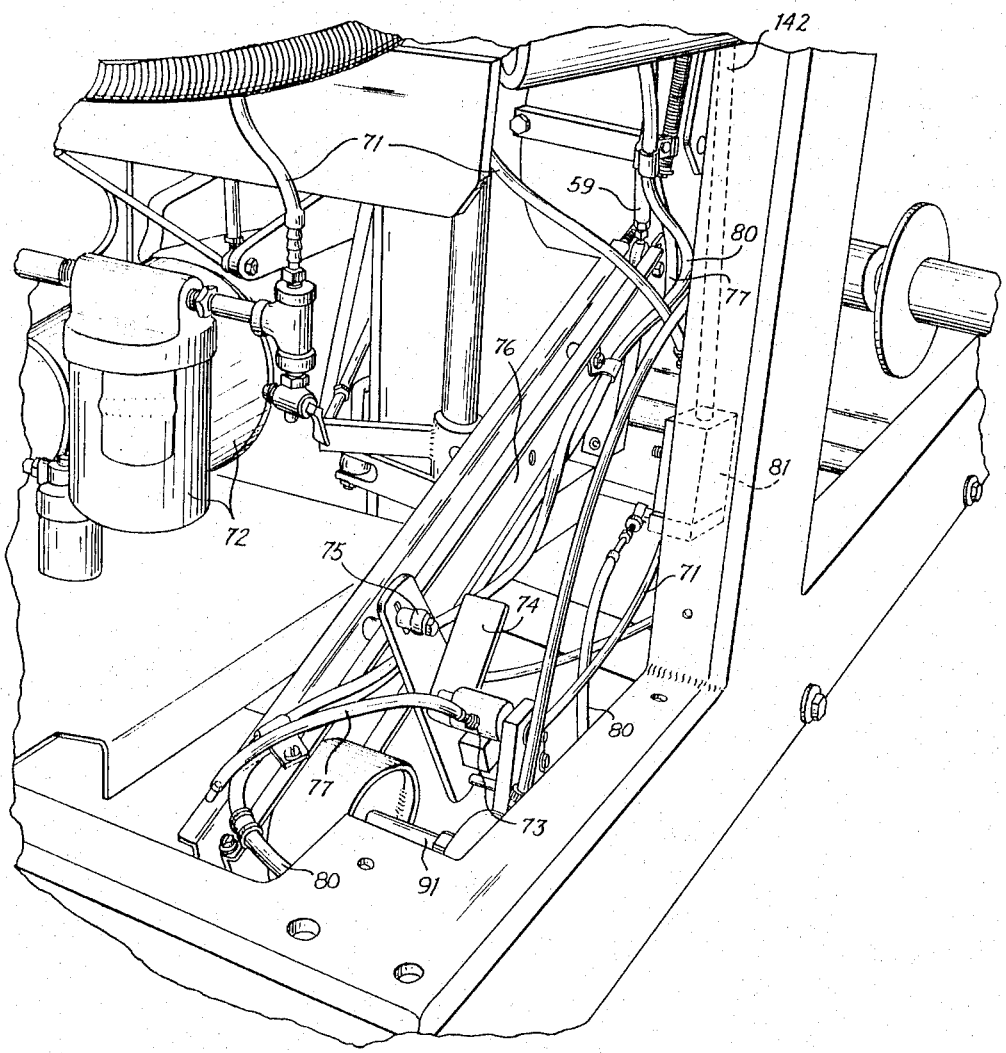
FIG. 7 is a perspective view of another portion of the drive mechanism and of a related vacuum control device.

The remainder of the vacuum system is best traced in FIG. 7.

A vacuum line 71 leads from a vacuum pump 72 to a main control valve 73 of known construction. Its movable valve member carries a vane 74 which lies in the path of two stops or projections 75 of an oscillating arm or lever 76 of the drive mechanism. Only the upper stop 75 is visible, the lower stop being hidden by the vane 74.

When the arm 76 moves up the lower stop strikes the underside of the vane 74 and moves it into the position shown in FIG. 7. In this position vacuum is transmitted through the valve 73 into a line 77 tied to the right push rod 59 and leading to a T connection 78 immediately left of the vent valve 67 (FIG. 2) thus transmitting vacuum to the line 69 as long as the vent valve 67 remains closed and the position of the vane 74 remains undisturbed.

This condition prevails during most of the downstroke of the oscillating arm 76. At the end of the downstroke the upper stop 75 (FIG. 7) strikes the vane 74 from above and relieves vacuum in the line 77 by exposing to the atmosphere a vent port in the valve body 73. Atmospheric pressure then prevails in the line 77 during most of the upstroke of the oscillating arm 76. Immediately before reaching the top position of its stroke the lower stop 75 strikes the vane 74 from below and re-establishes vacuum in the line 77.

The vent value 67( FIG. 2) mounted on the feeder carriage is capable of venting the vacuum in line 69 and branches 69' immediately and without time delay due to the small volumetric capacity of the vacuum line portions 69 and 69'.

The valve 67 serves a double function. Within the reach of its arm 68 a signal element 79 is provided which is normally raised. It is so shown in FIG. 2. When raised, the valve arm 68 passes underneath the signal element and the valve 67 remains undisturbed. This condition prevails during normal operation of the machine.

If, however, it is desired to interrupt the production of the box forming machine without stopping the machine itself, the signal element 79 is lowered in which position the valve arm 68 rides up on it and actuates the valve 67. Vacuum is then relieved at the cups 48 and no blank is fed.

Due to the length of the rearwardly extending arm 68, the arm 68, in turn, locks the signal element 79 in its prevailing position and prevents a change in the signal from becoming effective during the period in which the cups 48 are close to the magazine gate. A change in the signal from demand to no-demand, or from no-demand to demand therefore remains ineffective during that brief period during which the cups are capable of grasping a blank. This feature prevents a blank from being released immediately after being picked up which may then lead to misfeeding and forms the subject matter of an earlier Patent No. 3,089,698 to Thomas R. Baker et al. in which also details of the construction of the valve 67 are shown.

A signal duct 80 extends from the valve 67 downwardly to a control device 81 which will be referred to further below and whose function is to prevent actuation of an adhesive applicator during periods during which no blanks are being fed by the feeder.

Figure 3:
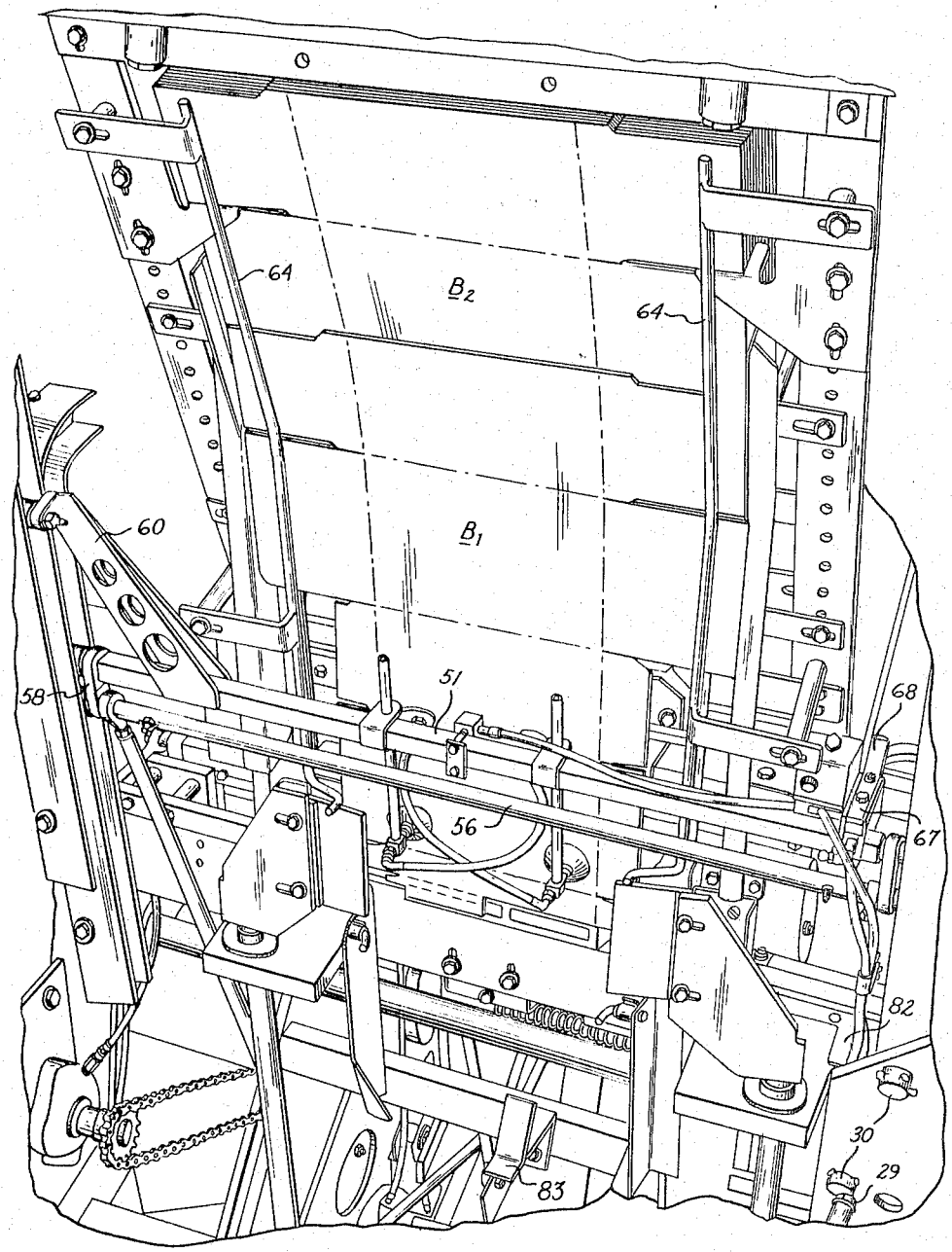

The second function of the vent valve 67 on the feeder carriage 51, 56, 58 is to vent the vacuum at the cups at the moment the feeder has reached its lowermost position. As best seen in FIG. 3, a bracket 82 is mounted in the path of the arms 68 of the valve 67. When the feeder carriage reaches the position in which the blank is to be released (FIG. 4) the valve arm 68 strikes the bracket 82 and vents the vacuum at the cups 48.

Figure 4:
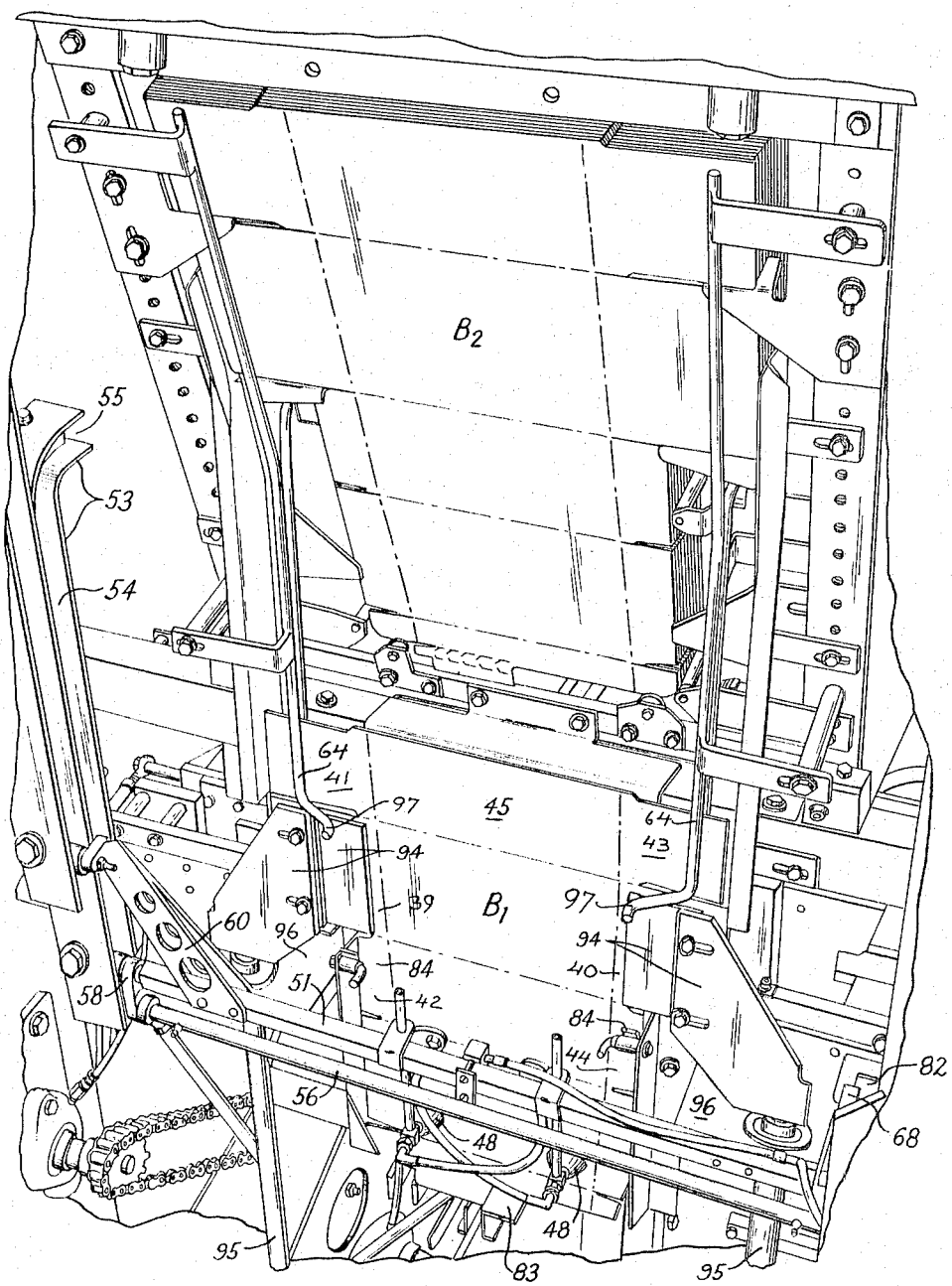

In FIG. 4 the cups are shown after release of the blank B at its delivery station at which the blank is held in position by a stop 83 on which the bottom edge of the blank comes to rest. In this position the bottom panel 45 of the blank B is accurately lined up with the box forming plunger 46 which, during the upstroke of the feeder and as soon as the feeder mechanism has cleared the path of the plunger, moves forward to force the blank through the forming die (see FIG. 1). In the meantime the feeder returns to pick up the next blank.

Figure 5:
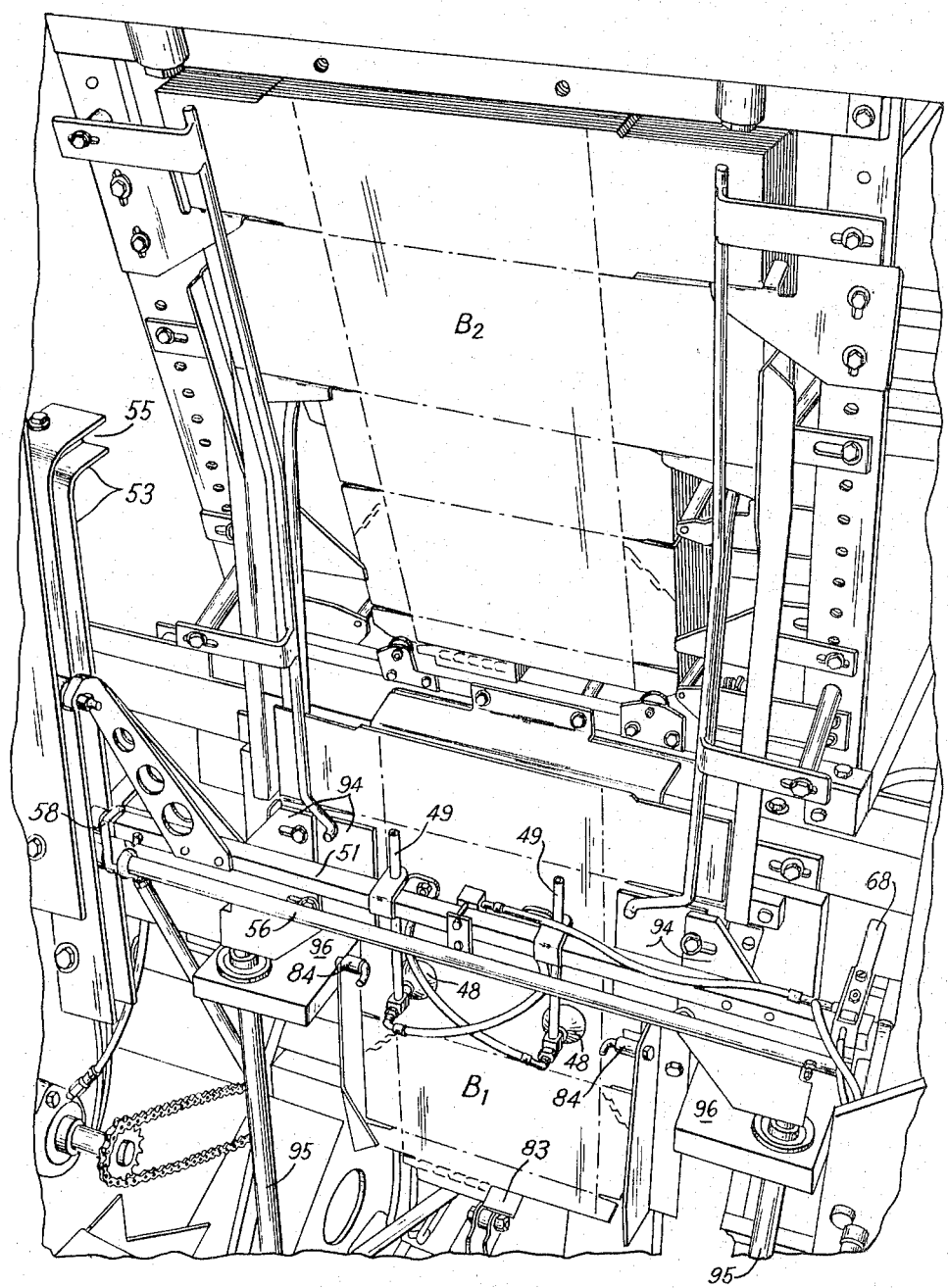
FIG. 5 is a perspective view of the feeder during its return stroke.

FIG. 5 shows the feeder mechanism during the initial phase of its upward return motion at a moment at which the box forming plunger is still a certain distance rearwardly of the delivered blank $B_1$.

*Summary of feeder operation*

Beginning with FIG. 5 showing the feeder carriage during its upward return stroke, the arms 49 of the vacuum cups 48 are nearly perpendicular and the cups clear the delivered blank $B_1$ by a sufficient margin.

As the carriage enters the curved portion 55 of its track 53 (FIG. 1) the control arm 60 of the square bar 51 continues its travel within the straight track 63, as a result of which the arms 49 of the feeder cups 48 are tilted to bring the cups into contact with the foremost blank in the magazine.

At this moment vacuum is supplied to the cups through line 69. The cups 48 attach themselves to the blank and the feed stroke of the feeder begins.

As the push rods 59 pull the carriage 51, 56, 58 from the curved track portion 53 into the straight track portion 54 the cups 48 on their arms 49 perform a pendulous motion toward the observer, as a result of which the lower portion of the blank is pulled out of the grip of its retaining elements 13 and 14 at the magazine gate. Air enters behind the withdawn blank and the blank slides off its aligning brackets 15, 16 and moves downward firmly held by the cups 48.

The blank is guided laterally between the forward and the rear guide rods 64 and 65 and crosses the path of the plunger (FIG. 3), which at this moment is retracted.

At the bottom of the feeder stroke of the carriage 51, 56, 58 the blank comes to rest on the stop 83 and is released by the cups 48 which are vented to the atmosphere when the vent valve arm 68 strikes the bracket 82.

The adjustment of the vacuum cups 48 is such that the blank is pulled slightly toward the observer during transport, as a result of which the blank is bowed. When released the blank flattens out (FIG. 4) and leaves sufficient clearance between it and the cups 48 while the feed carrier makes its return stroke (FIG. 5).

Cam elements 84 (FIGS. 4 and 5) also assist in maintaining the delivered blank in a position away from the mouths of the upwardly moving vacuum cups 48.

During the entire feed stroke the blank is positively guided until set down on the stop 83 and there is no movement of the blank due to gravity, nor is there any rebounding action at the stop. This insures extreme accuracy of alignment with the box forming plunger which subsequently pushes the delivered blank through the die.

In considering FIGS. 2 to 5 it will be remembered that the die was swung out of the way and out of the illustration, in order to show details of the feeding mechanism more clearly.

Figure 6:
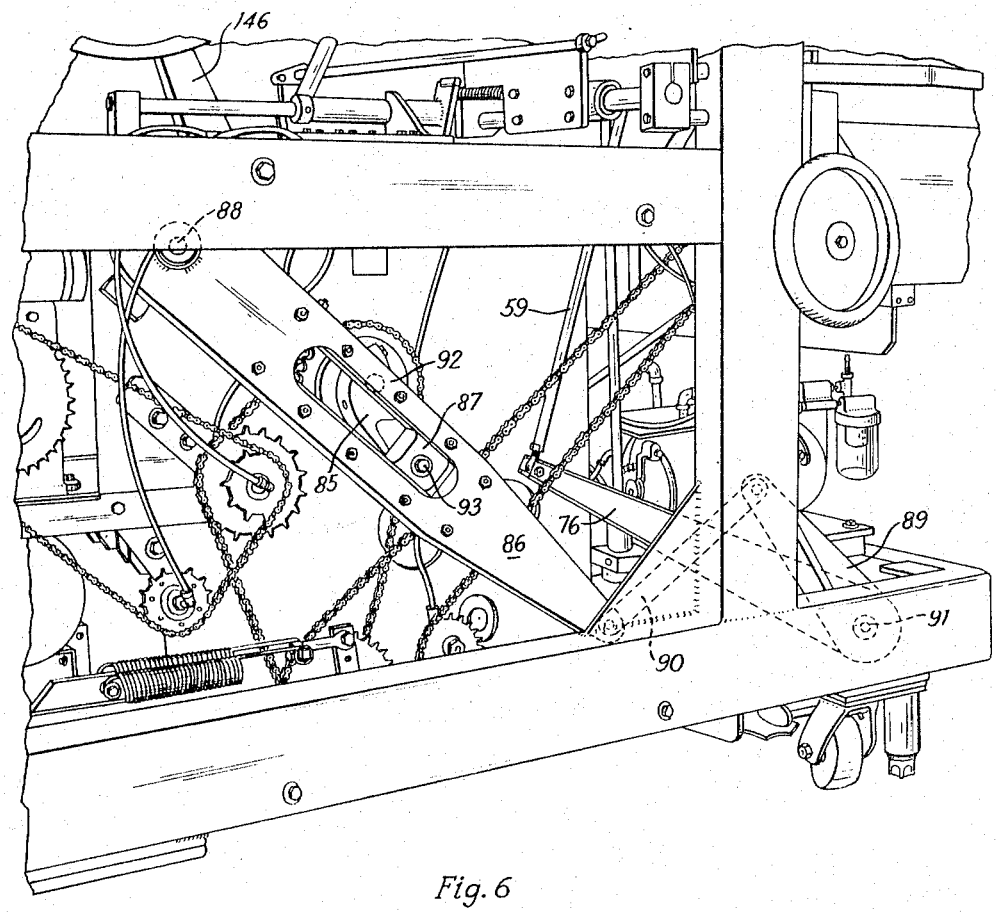
FIG. 6 is a perspective view of another portion of the drive mechanism of the machine.

Referring to FIG. 6, the centrally visible main crank 85 may be considered the principal drive element of the machine. Its shaft 92 may be driven by an electric motor over a suitable reduction gear (not shown).

The crank 85 engages an oscillating beam 86 by means of a glide block 87 through which the crank pin 93 extends.

The beam 86 is pivotally mounted in the machine framework at 88 and drives an oscillating input lever 89 through a connecting rod 90.

The previously mentioned oscillating arm 76 is fixed on the same shaft 91 on which the input lever is mounted and rocks with it. The push rod 59 extends upwardly from the arm or output lever 76 and moves the feeder carriage up and down.

The rock shaft 91 extends across the machine and carries one oscillating arm 76 near each end of operation of the two push rods, one oscillating arm being visible in FIG. 6, the other in FIG. 7.

The geometry of the feeder forms the subject matter of a separate application Ser. No. 410,179, now Patent No. 3,269,724 dated Aug. 30, 1966.

Returning now to FIGS. 4 and 5 showing the delivered flat blank $B_1$ squarely in the path of the retracted box forming plunger, it will be noted that the blank is forwardly supported by the cam elements 84 and further by a pair of laterally disposed support members 94 preferably in the form of tiltable vanes mounted on vertical tilt shafts 95 supported in bearing brackets 96. The lower ends of the forward guide rods 64 are shaped as a further pair of cam elements 97, the disposition being that the upper elements 97 are at the level of the inner end panels 41, 43, that the lateral supporting members 94 are at the level of the outer end panels 39 and 40 and that the lower cam elements 84 are at the level of the inner end panels 42, 44.

The advancing plunger (FIG. 8) engages the blank bottom panel and pushes the blank in the direction towards the observer. The lateral supporting members swing from their original position in which they were parallel to the flat blank (FIG. 4) into a tilted position (FIG. 8) and fold the outer end panels 39, 40 with respect to the bottom panel while the upper and lower camming elements 97 and 84 (the latter being obscured by blank panels 39, 40) fold the respective inner end panels 41, 43 and 42, 44 under the outer end panels 39, 40.

Figure 8:
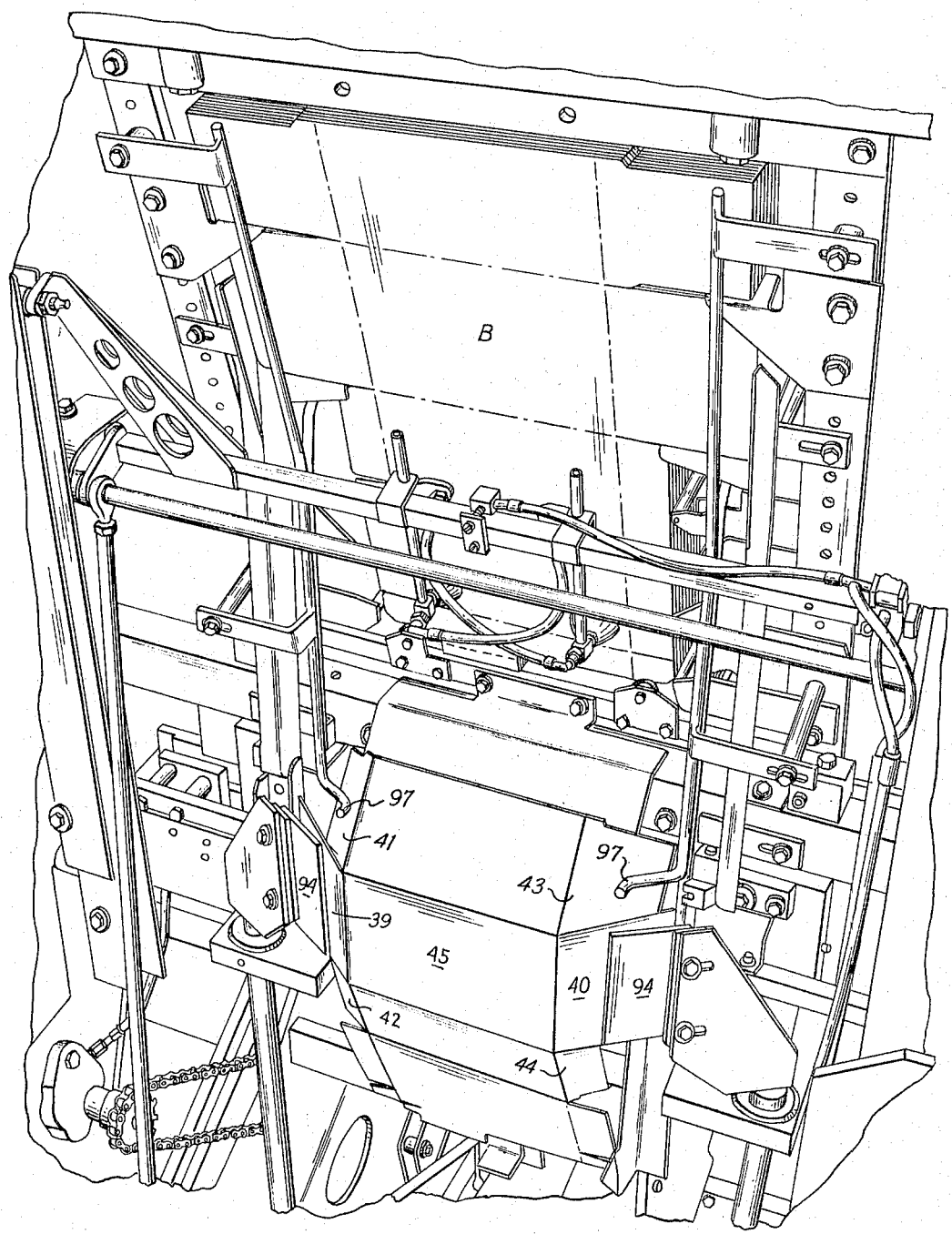
FIG. 8 is a perspective view of the initial stage of the box forming operation, the forming die being swung out of the way for better visibility.

FIG. 8 shows this action clearly, but it should be remembered that in order to show the folding of the end panels the forming die was swung out of the way (compare FIG. 1) in order not to obscure the folding action.

The specific form of blank B shown in the drawings requires adhesive in order to maintain the shaped box in formed condition. The adhesive applying mechanism will be described further below. The blank could also be of the self-locking style in which case the folding procedure would be similar, the sequence of the folding of the end wall forming panels being controlled by the respective cam elements and the lateral supporting members.

FIG. 1 shows the blank folded about the plunger at a moment just prior to application of pressure to the box ends by the rollers 37, 38.

Figure 9:
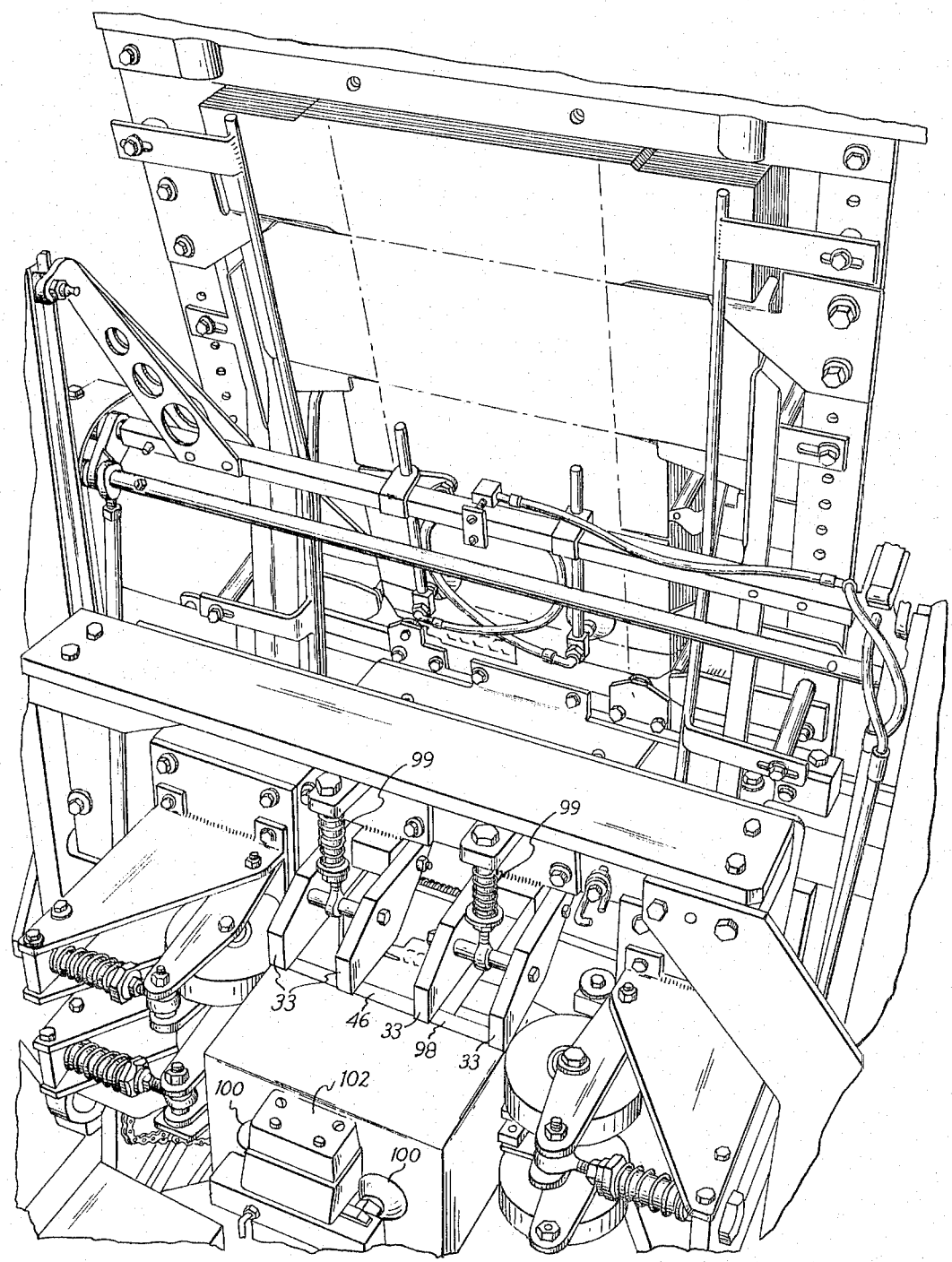
FIGS. 9, 10 and 11 illustrate the completion and delivery of the box.

In the position illustrated in FIG. 9 the plunger 46 has reached its extreme extended position in which the top edge 98 of the box body has moved just beyond the ends of the die cams 33. These snap past the edge 98 under the action of springs 99 and prevent the box from following the plunger which is about to retract.

Figure 10:
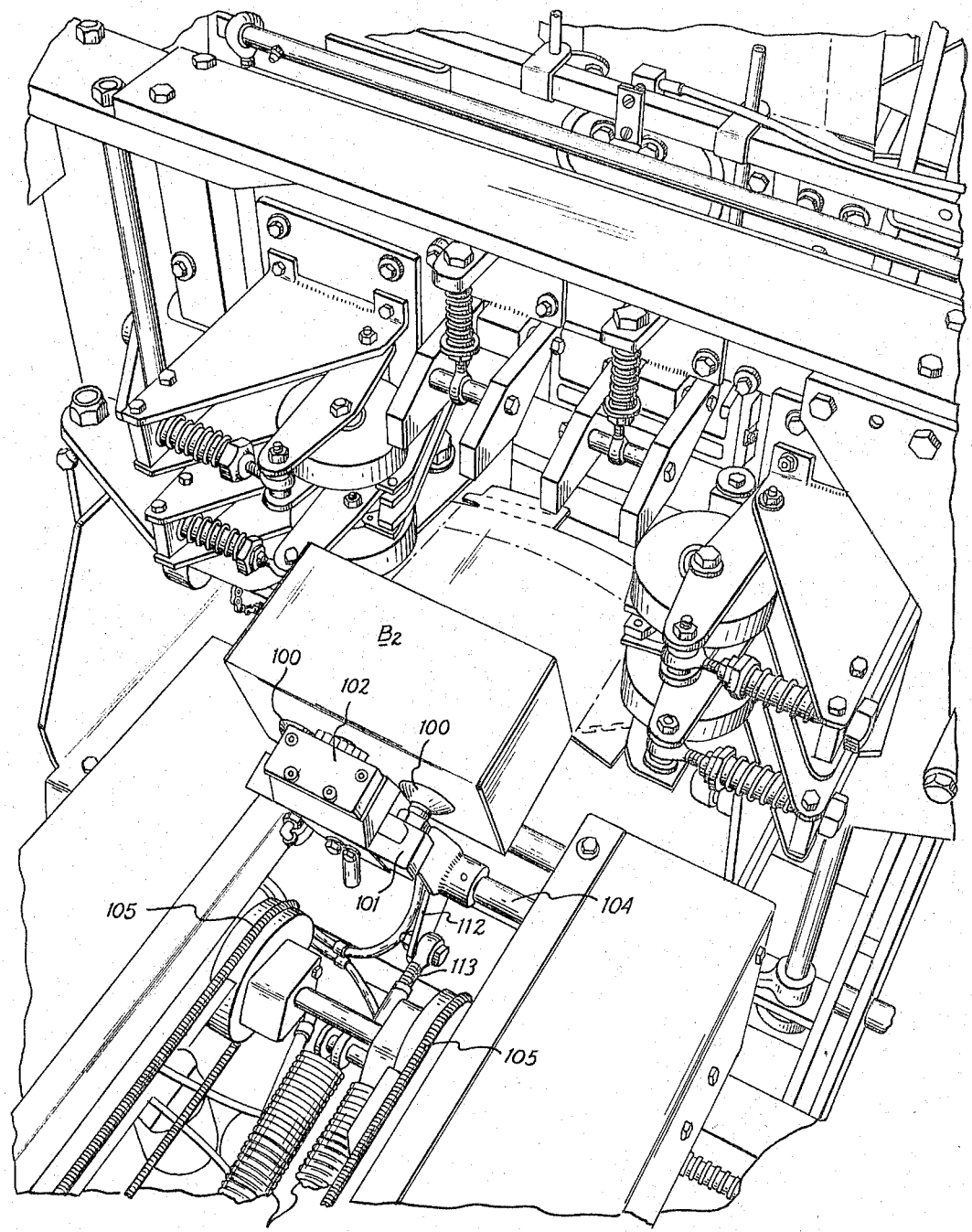

At this moment a box removal unit comes into action which is best seen in FIGS. 9 and 10. The illustrated removal unit is shown combined with a coding device for imprinting or embossing a code symbol on the box bottom.

The unit comprises a pair of vacuum cups 100 on a head 101 which also carries a code printer or embosser 102 for which a plastic insert 103 in the plunger (see FIG. 2) forms an anvil. The head 101 is mounted on an arm 104 (obscured by the head) on an oscillating shaft 104 which makes an oscillatory motion of slightly more than 90 degrees from an upright position (FIG. 9) in which the cups 100 are vertical to a retracted position (FIG. 11) in which the cups are retracted slightly below the level of a conveyor 105 (FIGS. 10 and 11) which then moves the completed folding box on towards filling and closing equipment.

Figure 11:
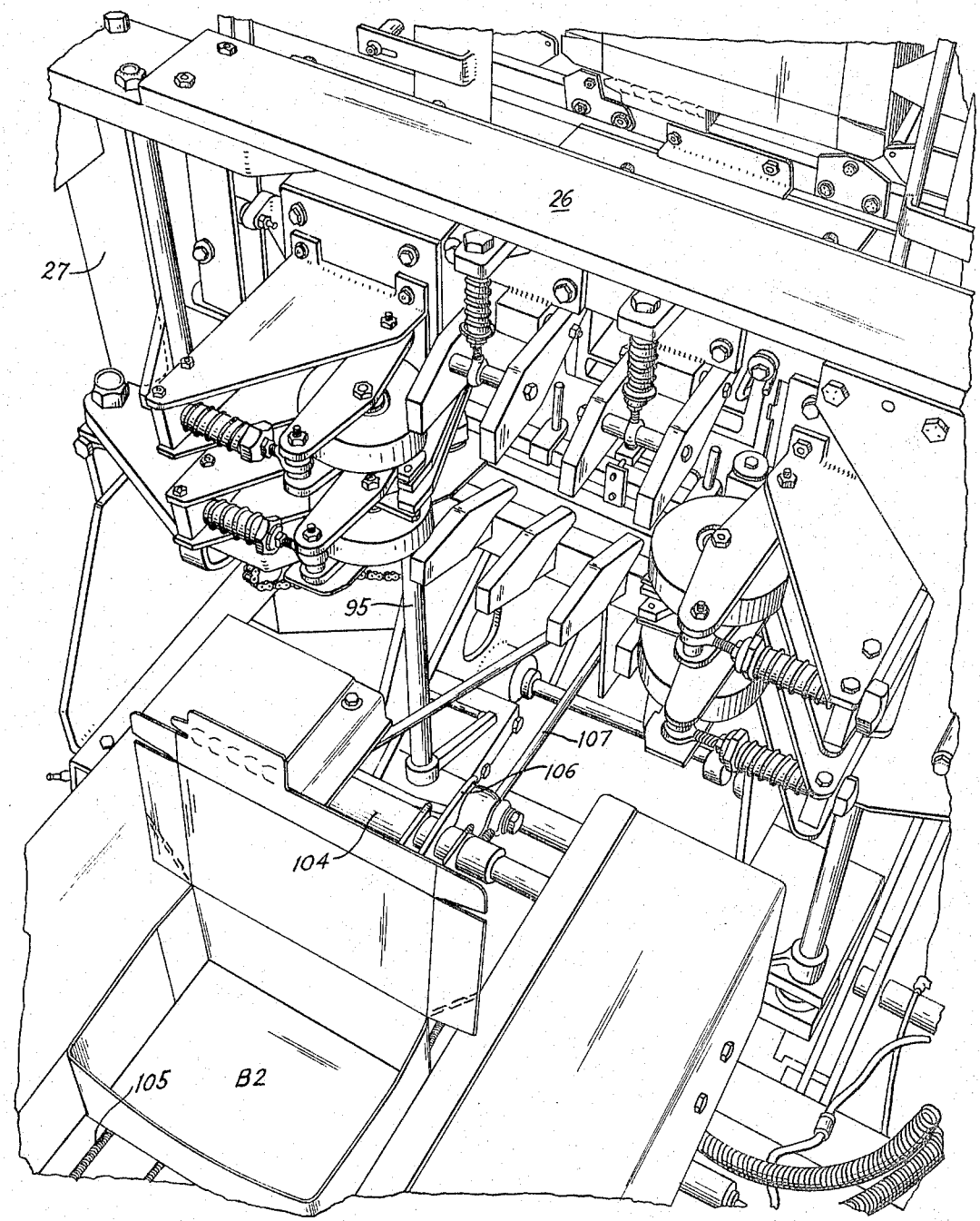
Figure 12:
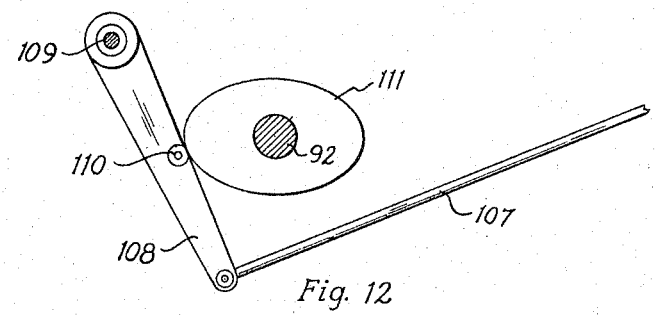
FIG. 12 is a diagrammatic representation of actuating mechanism for the box delivery device shown in FIGS. 9 to 11.

The operating mechanism for the box removal unit comprises an arm 106 (FIG. 11) on the shaft 104 from which a connecting rod 107 leads to a lever 108 (FIG. 12) pivoted within the machine frame at 109. The lever carries a cam follower 110 bearing against a cam 111 on the crank shaft 92. As shown in FIG. 10, a second arm 112 has a yoke 113 connected thereto to which two springs 114 are attached. The springs 114 are under tension and tend to raise the head 101 thus also furnishing the power required by the printing unit 102, 103. The cam (FIG. 12) positively acts to swing the head 101 down, thereby tilting the box into upright position as shown in FIG. 11. When set upright the box B₂ is released by relieving the vacuum at the cups 100 by an appropriate control valve similar to valve 73.

The illustrated box forming machine is specifically fitted to produce glued boxes. The device for applying the adhesive is shown in FIGS. 13 to 16 and comprises a pair of carrier plates 115, 116 laterally disposed with respect to the plunger 46 (visible in FIGS. 13 and 16). Each carrier plate has a slide bushing 117 attached to it near its lower edge for sliding movement on a horizontal rod 118, the ends of which are clamped to the machine frame at 119. The upper portions of the carrier plates are guided by track plates 120 on the machine frame straddled by guide rollers 121 and 122 in front and in back of the track plates, respectively. The guide rollers are mounted on vertical pivots of a T shaped bracket 123 secured to the respective carrier plate at 124.

The carrier plate 116 has a horizontal extension 125 near its center and the carrier plate 115 as a horizontal extension 126 near its bottom edge.

A centrally disposed oscillating shaft 127, which is periodically rocked by means of a connecting rod 128, carries a T shaped head 129 to the ends of which roller studs 130 and 131 are secured. The stud 130 bears against the extension 125 of the right plate 116 (FIG. 13) and the stud 131 (FIG. 15) bears against the extension 126 of the left plate 115.

Centrally disposed on the slide rod 118 and clamped thereto is a block 132 from which a lower return spring 133 extends to the left plate 115. A similar upper return spring leads to the right plate 116, but is not visible in the illustrations.

The plates 115 and 116 are drawn towards each other and towards the block 132 by the return springs, and the amount of travel is restricted by appropriate limit stops, one such stop being visible at 134.

The spring-powered movement of the plates towards the path of the plunger occurs whenever the oscillating shaft 127 is moved in a counterclockwise direction (FIG. 15) and oscillation of the shaft 127 in a clockwise direction (FIG. 13) moves the carrier plates 115, 116 outwardly by positive action so as to insure clear passage of the plunger 46 therebetween.

The plates 115 and 116 carry adhesive applicators which, in the illustrated embodiment, are hot melt adhesive applicators fitted with ball type dispensing valves.

Figure 13:
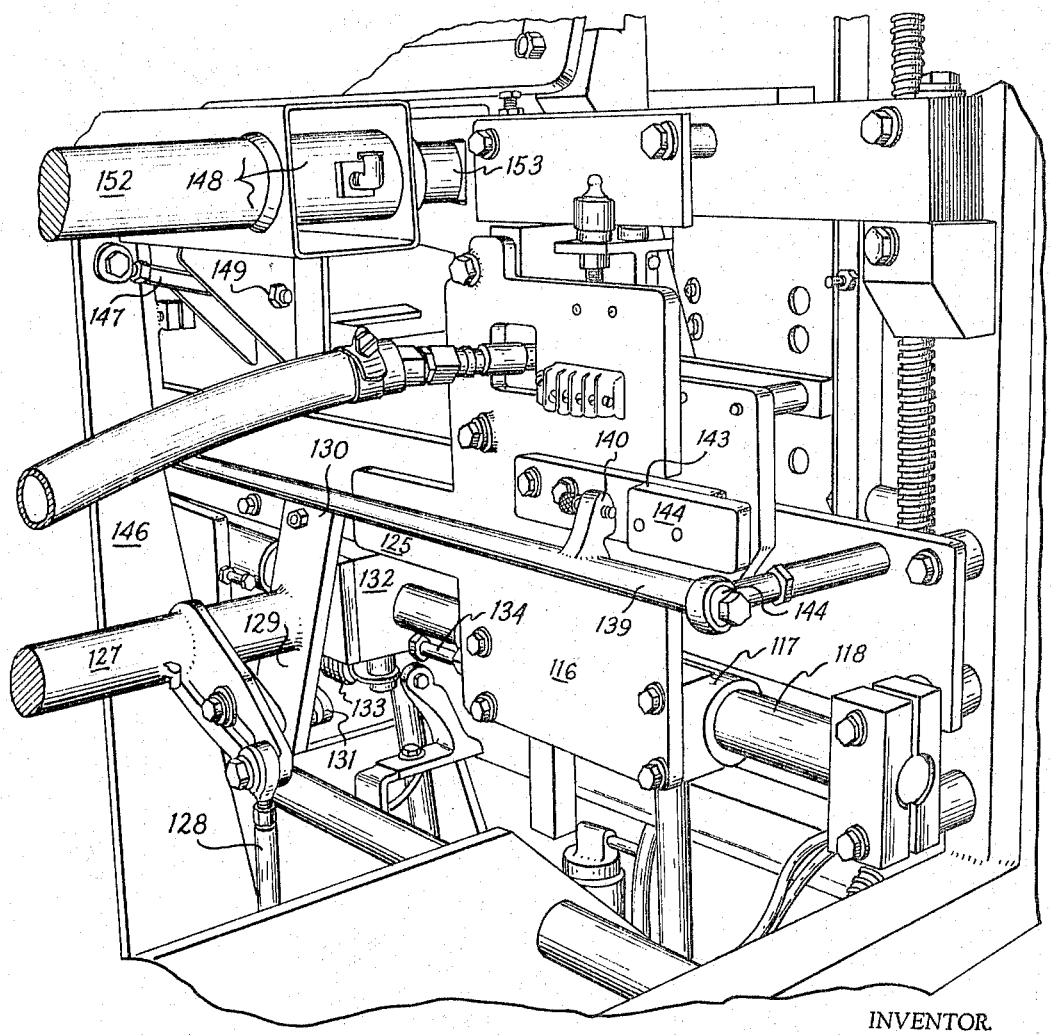
FIGS. 13 to 15 are pesrpective views of an adhesive applicator and a control device therefore.
Figure 15:
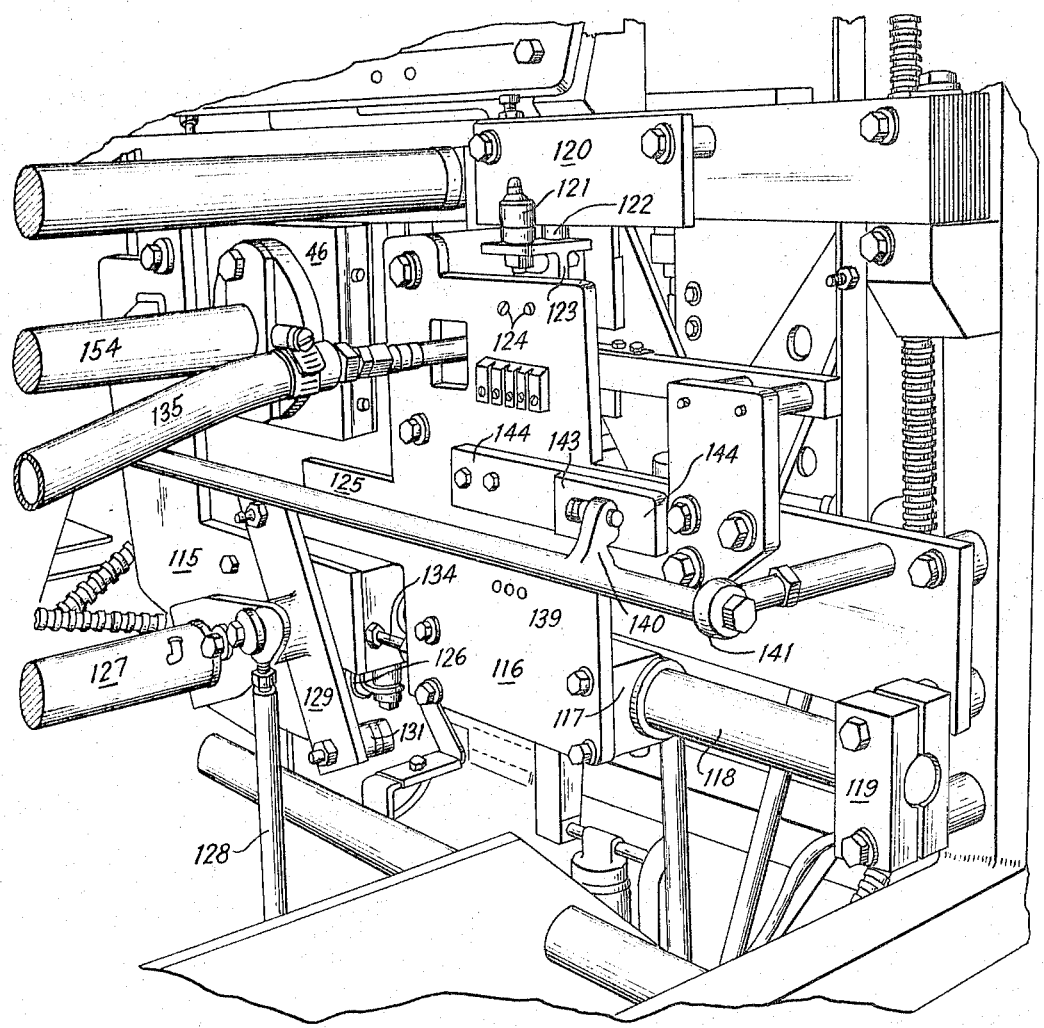
Figure 16:
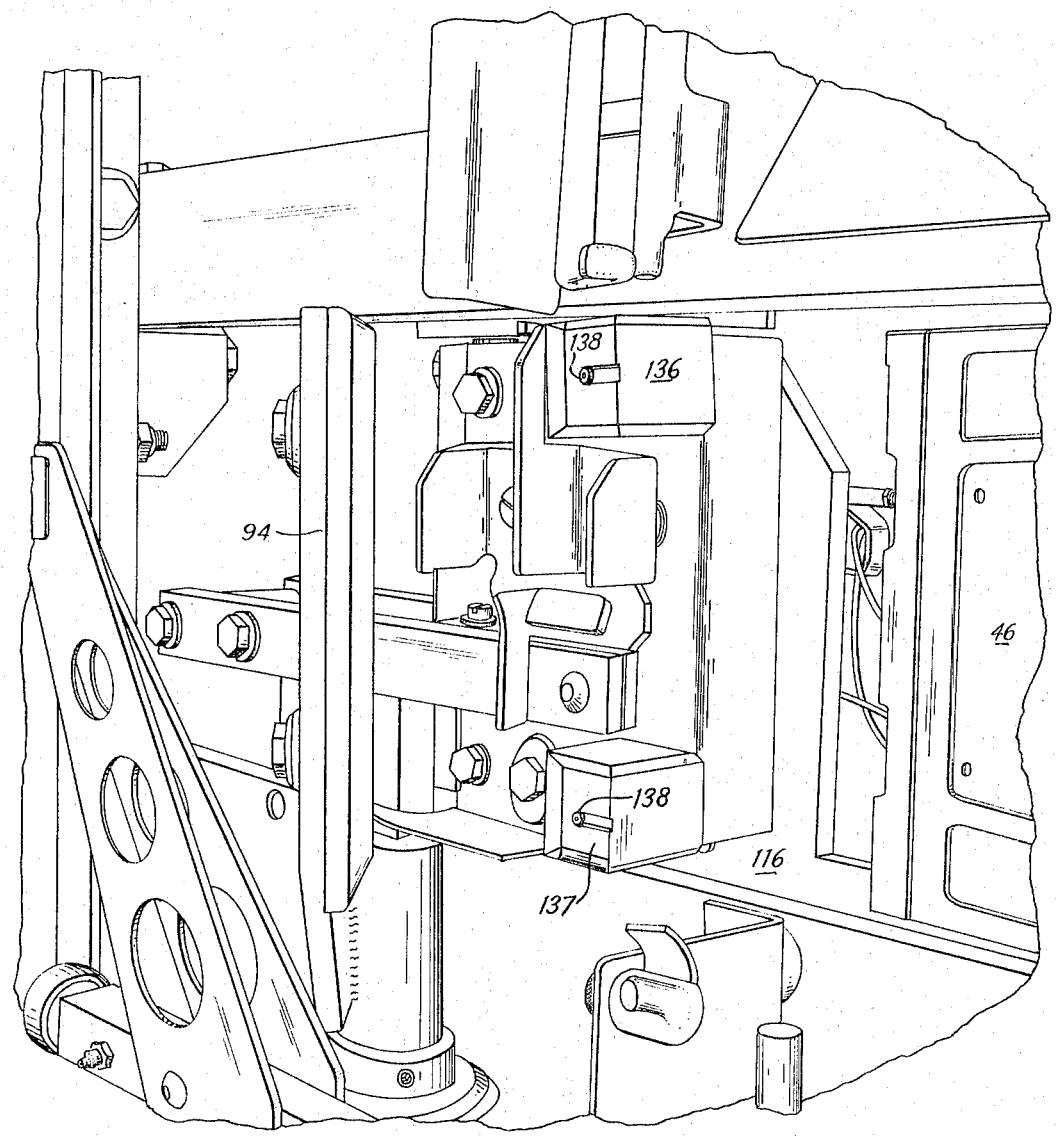
FIG. 16 is a perspective view of an adhesive applicator proper.

The supply duct for the right applicators carried by the plate 116 is best seen in FIGS. 13 and 15. The construction of the applicators is best seen in FIG. 16.

The plate 116 carries upper and lower applicator heads 136 and 137, each provided with a ball type dispensing nozzle 138, which is normally closed by spring pressure and which opens to discharge adhesive when a blank is pressed against it.

A blank is pressed against the applicator nozzles 138 by the lateral supporting members or vanes 94 when the latter are in the non-tilted position as shown in FIG. 4.

Just prior to application of adhesive, the carrier plates 115, 116 are in their inward position (FIG. 15), a blank is in place and the vanes 94 move from their tilted position into flat position so as to press the blank against the applicators 136, 137. Immediately thereafter the carrier plates 115, 116 are moved outwardly by the action of the tilt shaft 127 (FIGS. 13, 15) producing horizontal streaks of adhesive on the blank. The vanes 94 then tilt, thereby stopping the flow of adhesive. The tilted vanes then act as folding guides (FIG. 8) as previously described.

It is desirable to prevent the accidental discharge of adhesive in the event no blank is being fed into position by the feeder.

Figure 14:
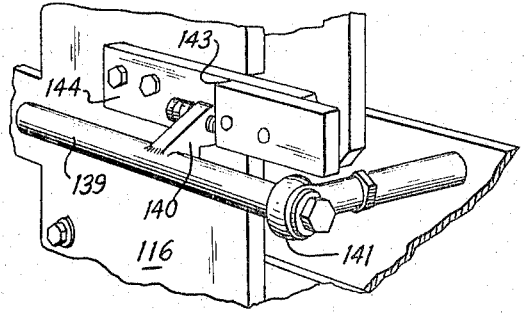

This is accomplished by a locking mechanism shown in FIGS. 13 and 15, the locking action of the mechanism being shown in FIG. 14.

A transverse rock shaft 139 carries a locking cam 140 and is transversely mounted in the machine frame in bearings 141. The far end of the shaft 139 carries an arm (not visible) to which a push rod 142 extends from the control device 81 (FIG. 7). When the push rod 142 is downwardly retracted by the control device 81 as a result of vacuum applied to the control device through duct 80 (FIG. 7), the locking cam 140 clears the shoulder 143 of a bar 144 on the carrier plate 116 and permits the plate to slide inwardly into the position in which adhesive is applied to a blank deposited by the feeder.

Absence of a blank is caused by the control device 81 which responds to the absence of vacuum at the feeder cups 48. The control device 81 raises the push rod 142 and causes the locking cam 140 to be rotated into engagement with the shoulder 143. This locks the carrier plate 116 in its outward position (FIG. 14) and the applicator nozzles 138 remain out of reach of the supporting members on vanes 94 (shown in FIG. 16 in a deflected position for the purpose of exposing the adhesive applicators to better view).

The several component units of the box forming machine, more particularly the feeder, the plunger 46, the vanes 94, the adhesive applicators are operated in timed relationship by a common drive mechanism, the remainder of which will now be described.

Figure 17:
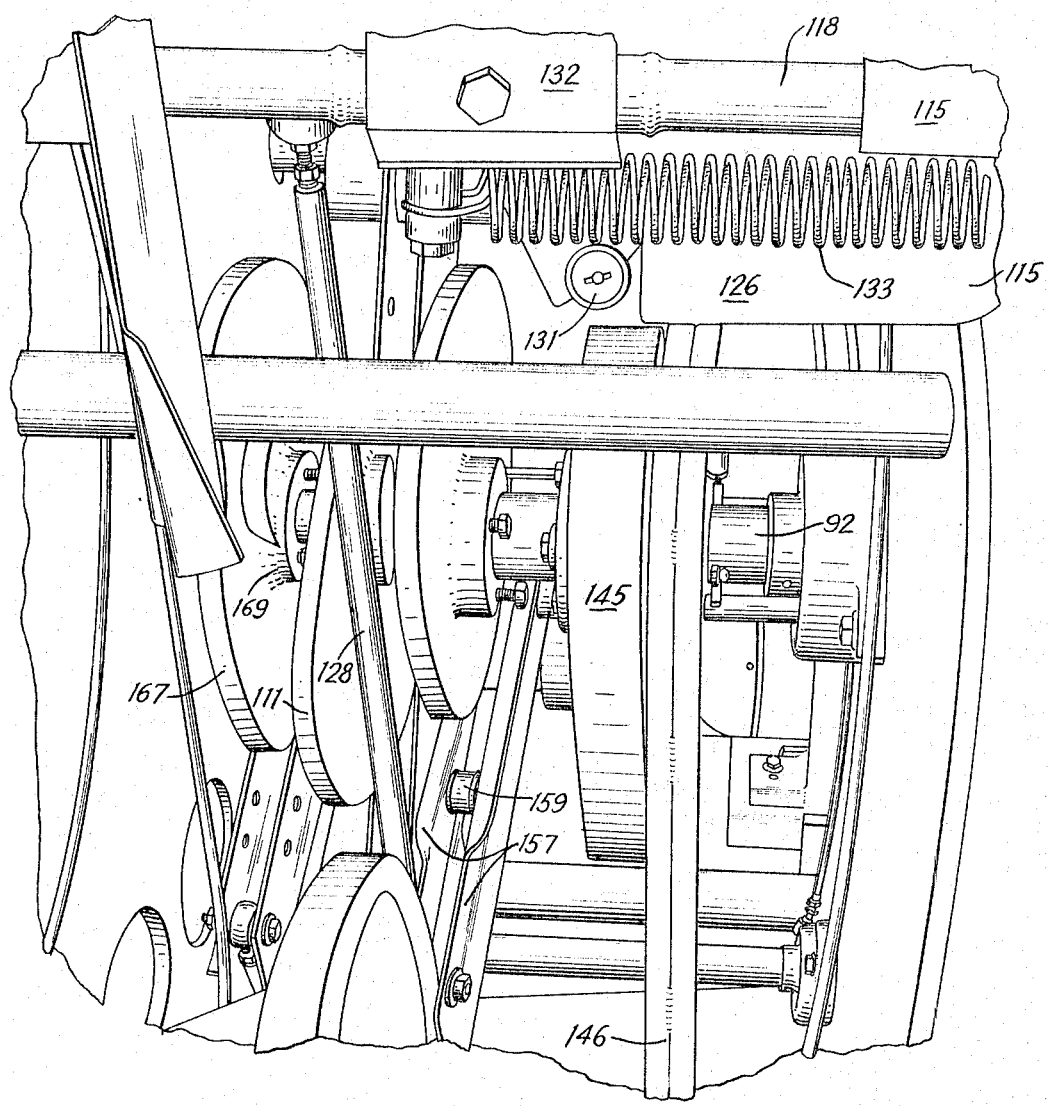
FIGS. 17 and 18 show in perspective a cam drive assembly for operating the several units of the machine in timed sequence.
Figure 18:
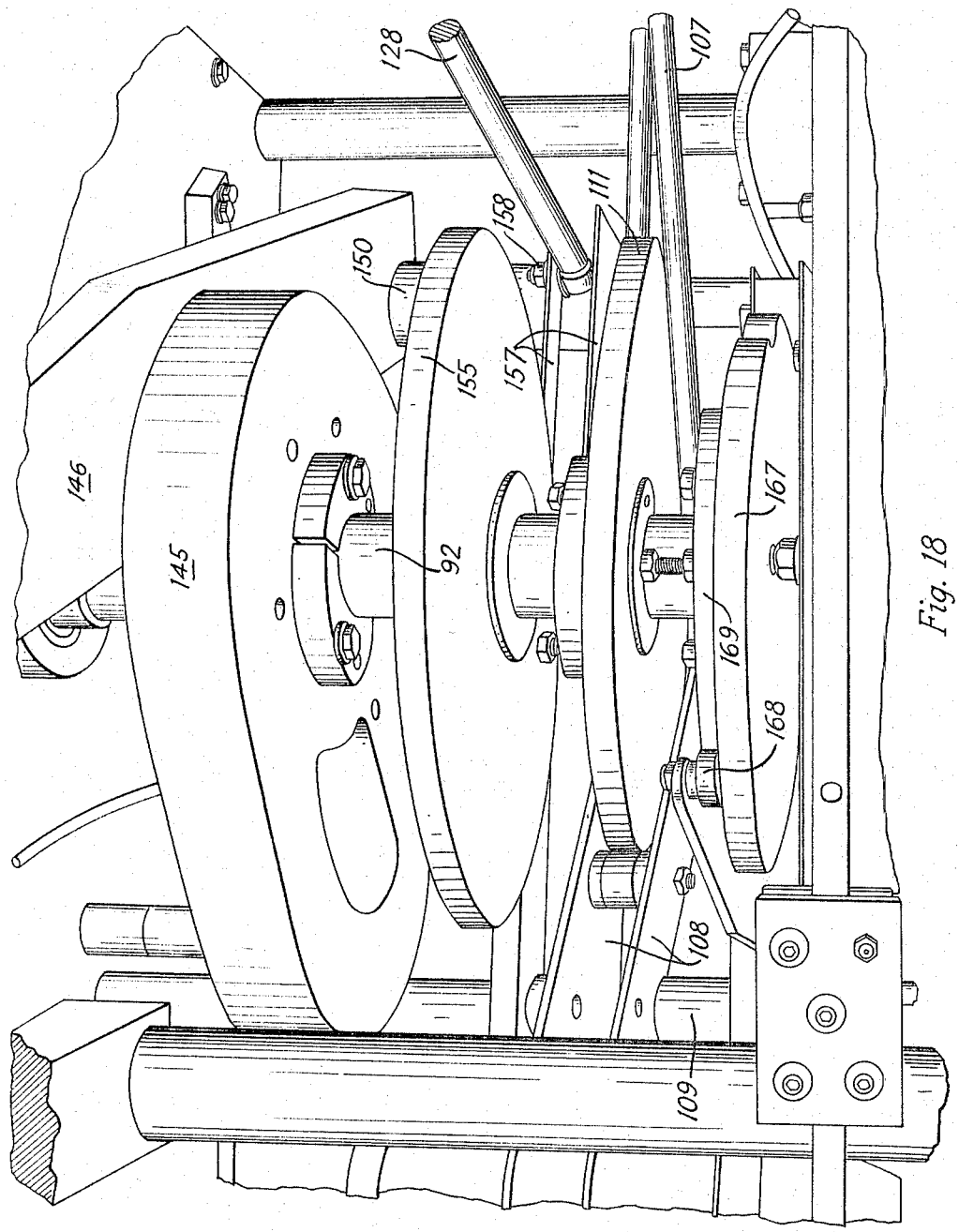

The previously described crank shaft 92 on the end of which the crank 85 for driving the feeder is mounted (FIG. 6) also carries a plurality of cams fixedly mounted thereon inside the machine frame, as best seen in FIG. 17 looking down into the machine from the end of the delivery conveyor and in FIG. 18 looking down into the machine from its side.

Figure 19:
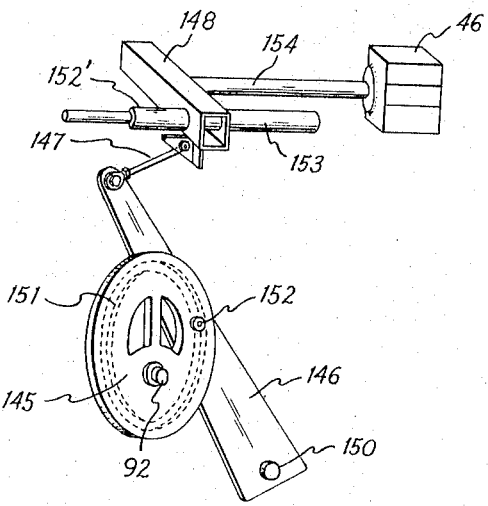
FIGS. 19 to 21 are diagrammatic illustrations of the several cam devices for illustration of their respective functions in a simplified manner.

The far cam 145 in FIG. 18 is a casting and serves to move the box forming plunger 46 back and forth. The plunger drive cam has a closed cam track machined into its far side engaged by a follower pin on an upright plunger drive arm 146. A portion of the plunger drive arm is also visible in FIG. 13. A connecting link 147 connects the upper end of the arm 146 with a cross head 148 at 149. The mechanism is shown diagrammatically in the somewhat simplified FIG. 19 showing the drive arm 146 pivoted at 150. The cam track 151 and the follower pin 152 are indicated in broken lines. The cross head 148 has slide bushes 152' mounted thereon slidable on rods 153 and a plunger stem 154 extends from the cross head to the plunger 46 proper.

Figure 20:
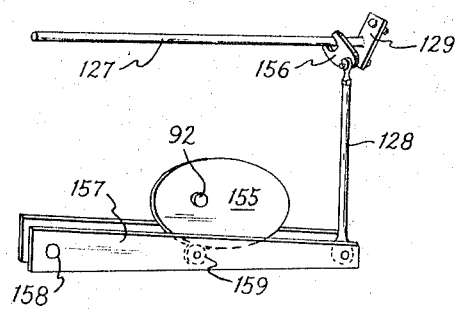

The second cam 155 in FIG. 18 serves to move the carrier plates 115 and 116 back and forth. The diagrammatic figure illustrates the drive in about the position in which the elements are in FIG. 13. The oscillating shaft 127 (FIGS. 13 and 20) carries the T head 129 and an arm 156 from which the connecting rod 128 leads to a substantially horizontal drive arm 157 pivoted at 158 in the machine frame. The drive arm 157 carries a follower 159 which engages the periphery of the cam 155. The cam follower is urged into contact with the cam periphery by torque acting on the shaft in a counterclockwise sense. It will be remembered in this connection that the carrier plates 115 and 116 are fitted with return springs 133 (FIG. 13) which produce this torque.

The next cam 111 in FIG. 18 operates the head 101 which removes the formed boxes and sets them upright. Cam 111 and its linkage was described above in connection with FIG. 12 which is its diagrammatic illustration.

Figure 21:
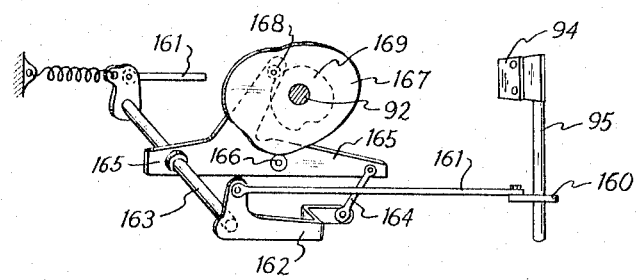

The cam nearest the observer in FIG. 18 is a double cam for operating the lateral support members 94 and their tilt shafts 95. This mechanism is best understood by first referring to its diagrammatic representation as shown in FIG. 21.

The tilt shafts 95 of the members 94 (only one being shown) are provided with an arm 160 from which a link 161 extends to one arm of a bell crank lever 162 which is fixed on a transverse shaft 163. The other arm of the bell crank lever has a link 164 articulated thereto which extends to a forked arm 165 which is pivoted on the shaft 163. The lower portion of the forked arm carries a cam follower 166 which contacts the periphery of the large diameter cam 167 and the upwardly extending fork portion of the cam carries a follower 168 contacting the periphery of the small diameter cam 169. Both cams 167 and 169 are rigidly connected and are fixed on the crank shaft 92.

The peripheral contour of the cam 167 is so generated as to provide the appropriate motion characteristics of the supporting members 94, and the small diameter cam is so generated as to cause the follower 168 to trace it substantially without play. Thus the large cam controls the motion of the supporting members 94 towards the blank, which may be termed its work stroke, and the smaller cam controls the return stroke. The same effect could, of course, be produced by a closed cam similar to cam 145 (FIG. 18), but the twin cam construction has the advantage of simpler layout and manufacture.

What is claimed is:

1. A machine for forming folding boxes from flat box blanks, the machine comprising, in combination, an open-ended box forming die disposed with its axis substantially horizontal; a horizontal box forming plunger movable into, and out of, said die by a stroke sufficiently long for the plunger end to clear the mouth of the die by a gap when retracted, and to project from the end of the die when extended; a box removal means comprising a first vacuum cup pivotally mounted about a horizontal axis transverse to the plunger and die axes for arcuate movement of the mouth of the cup from a first substantially vertical position in which it lies substantially in the plane of the end surface of the extended plunger into a second substantially horizontal position, so as to remove a box driven by the plunger through the die and simultaneously set the box upright; a blank feeder comprising a second vacuum cup mounted for substantially vertical reciprocating movement through said gap, the path of the feeder cup crossing the path of the end of the plunger; and means for operating said plunger, said removal means and said feeder in timed relationship.

2. A machine for forming folding boxes from flat box blanks, the machine comprising, in combination, an open-ended box forming die disposed with its axis substantially horizontal; a horizontal box forming plunger movable into, and out of, said die by a stroke sufficiently long for the plunger end to clear the mouth of the die by a gap when retracted, and to project from the end of the die when extended; a box removal means comprising a first pair of vacuum cups pivotally mounted about a horizontal axis transverse to the plunger and die axes for arcuate movement of the mouths of the cups from a first substantially vertical position in which the mouths lie in a substantially vertical plane at the end of the plunger stroke into a second substantially horizontal position so as to remove a box driven by the plunger through the die and simultaneously set the box upright; a blank feeder comprising a pair of spaced vertically extending tracks, a carriage movable up and down on said tracks through said gap, and a second pair of vacuum cups on said carriage with their mouths in a substantially vertical plane, the second pair of cups being so spaced and mounted on said carriage as to intersect the path of the bottom of the plunger; and means for operating said plunger, said removal means and said carriage in timed relationship.

3. A machine for forming folding boxes from flat box blanks, the machine comprising, in combination, an open-ended box forming die disposed with its axis substantially horizontal; a horizontal box forming plunger movable into, and out of, said die by a stroke sufficiently long for the plunger end to clear the mouth of the die by a gap when retracted, and to project from the end of the die when extended; a box removal means comprising a first vacuum cup pivotally mounted about a horizontal axis transverse to the plunger and die axes for arcuate movement of the mouth of the cup from a first substantially vertical position in which it lies substantially in the plane of the end surface of the extended plunger into a second substantially horizontal position so as to remove a box driven by the plunger through the die and simultaneously set the box upright; a blank magazine adapted to support a stack of blanks resting on edge, said magazine comprising a withdrawal gate within which the foremost blank is held in a position in which its top edge is in advance of its bottom edge; a blank feeder comprising vertically extending track means, a carriage guided for reciprocating vertical movement by said track means, a second vacuum cup mounted on said carriage with the plane of its mouth substantially vertical, and means for tilting said second cup into contact with said foremost blank when said second cup is opposite said gate, said second cup being mounted on said carriage in such a position that its path crosses the path of the end of the plunger; and means for operating said plunger, said removal means and said feeder in timed relationship.

4. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of support members laterally disposed with respect to the path of the plunger for engaging the lateral panels of a blank on said stop means, said support members being movable from one end position in which they are substantially parallel to the end surface of the plunger into a second end position in which they assume an angle to said one end position; and power means for operating said plunger, said feeder and said support members in timed relationship.

5. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of support members laterally disposed with respect to the path of the plunger for engaging the lateral panels of a blank on said stop means, said support members being movable from one end position in which they are substantially parallel to the end surface of the plunger into a second end position in which they assume an angle to said one end position; a pair of upper folding elements above said support members; a pair of lower folding elements below said support members, said folding elements being mounted in positions to engage blank portions above, and below, said lateral panels, respectively, of a released blank on said stop means; and power means for operating said plunger, said feeder and support members in timed relationship.

6. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of plates laterally disposed with respect to the path of the plunger for engaging lateral portions of a blank whose main panel lies in the path of the plunger, each of said plates being tiltable about a vertical axis from a first position normal with respect to the plunger axis into a second position at an acute angle with respect to the plunger axis; and power means for operating said plunger, said feeder and tilting said plates in timed relationship.

7. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of plates laterally disposed with respect to the path of the plunger for engaging lateral portions of a blank whose main panel lies in the path of the plunger, each of said plates being tiltable about a vertical axis from a first position normal with respect to the plunger axis into a second position at an acute angle with respect to the plunger axis; a pair of upper folding elements above said plates; a pair of lower folding elements below said plates, said folding elements being mounted in a position to engage blank portions above, and below, said lateral panels, respectively, of a released blank whose main panel is lined up with the plunger end surface, said plates in their first position lying in advance of said folding members, said folding members lying in advance of said plates when the plates are in said tilted second position; and power means for operating said plunger, said feeder and tilting said plates in timed sequence.

8. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of plates laterally disposed with respect to the path of the plunger for engaging lateral portions of a blank whose main panel lies in the path of the plunger; an adhesive applicator associated with, and facing, each of said plates in a position to apply adhesive to one surface of the blank whose opposite surface faces the respective plate; and power means for operating said plunger, said feeder and said applicators in timed relationship.

9. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of plates laterally disposed with respect to the path of the plunger for engaging lateral portions of a blank whose main panel lies in the path of the plunger; an adhesive applicator associated with, and facing, each of said plates in a position to apply adhesive to one surface of the blank whose opposite surface faces the respective plate; means for moving said applicators in a substantially horizontal direction towards, and away from, the path of said plunger; and power means for operating said plunger, said feeder and said applicator moving means in timed relationship.

10. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of plates laterally disposed with respect to the path of the plunger for engaging lateral portions of a blank whose main panel lies in the path of the plunger, each of said plates being tiltable about a vertical axis from a first position in which they are substantially normal with respect to the plunger axis into a second position at a slant with respect to said first position; an adhesive applicator associated with, and facing, each of said plates in a position to apply adhesive to one surface of the blank whose opposite surface faces the respective plate; and power means for operating said plunger, said feeder, said applicators and tilting said plates in timed relationship.

11. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of plates laterally disposed with respect to the path of the plunger for engaging lateral portions of a blank whose main panel lies in the path of the plunger, each of said plates being tiltable about a vertical axis from a first position in which they are substantially normal with respect to the plunger axis into a second position at a slant with respect to said first position; an adhesive applicator associated with, and facing, each of said plates in a position to apply adhesive to one surface of the blank whose opposite surface faces the respective plate; means for reciprocating said applicators in a substantially horizontal direction towards, and away from, the path of said plunger; and power means for operating said plunger, said feeder, reciprocating said applicators, and tilting said plates in timed relationship.

12. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of support members laterally disposed with respect to the path of the plunger for engaging the lateral panels of a blank on said stop means; an adhesive applicator associated with, and facing, each of said supports in a position to apply adhesive to one surface of a blank resting on said stop means and whose opposite surface faces the respective support member; mounting means for supporting said applicators for reciprocating motion in a substantially horizontal direction towards, and away from, the path of the plunger; locking means for arresting said applicators in a position remote from the plunger path; control means responsive to the presence, and absence, respectively, of a blank at a predetermined portion of the machine for operating said locking means; and power means for operating said plunger, said feeder, and reciprocating said applicators in timed relationship.

13. A machine for forming folding boxes from flat box blanks comprising a main panel and lateral panels articulated to opposite ends of the main panel and adapted to form box ends, the machine comprising, in combination, an open-ended box forming die disposed with its axis substantially horizontal; a horizontal box forming plunger movable into, and out of, said die by a stroke sufficiently long for the plunger end to clear the mouth of the die by a gap when the plunger is retracted; a blank feeder comprising a vacuum cup mounted for substantially vertical reciprocating movement through said gap, the vertical stroke of the cup movement being sufficiently long for the cup to move into the path of the end surface of the plunger; stop means for a blank released by said cup for supporting the released blank in a position in which said main panel is aligned with the path of said end surface; a pair of support members laterally disposed with respect to the path of the plunger for engaging the lateral panels of a blank on said stop means; an adhesive applicator associated with, and facing, each of said supports in a position to apply adhesive to one surface of a blank resting on said stop means and whose opposite surface faces the respective support member; mounting means for supporting said applicators for reciprocating motion in a substantially horizontal direction towards, and away from, the path of the plunger; spring means for moving said applicators towards the path of said plunger; return means for positively moving said applicators in a direction away from the plunger against the action of the spring means; locking means for arresting said applicators in a position remote from the plunger path against the action of said spring means; control means responsive to the presence, or absence, respectively, of a blank at a predetermined portion of the machine for operating said locking means; and power means for operating said plunger, said feeder, and said return means in timed relationship.

14. A machine for forming folding boxes from flat box blanks, the machine comprising, in combination, a main frame; a box forming plunger mounted on said frame for reciprocating movement in a substantially horizontal direction; an open-ended box forming die hingedly mounted on said frame for movement from one position in which its axis is aligned with the axis of the plunger into a second position substantially at an angle to said one position; means for releasably locking said die in said one position; a blank feeder comprising a vacuum cup mounted for substantially vertical reciprocating movement between the said die and said plunger, considering the plunger in its retracted position in which it clears the die and the die in said one position, the vertical stroke of the cup movement being sufficiently long for the cup to move into the path of the end surface of the plunger; stop means for a blank released by said cup for supporting the released blank in a position in which the blank is aligned with said plunger; power means for operating said plunger and said feeder in timed relationship; and means controlled by the position of said die for rendering said power means inoperative.

15. A machine for forming folding boxes from flat box blanks, the machine comprising, in combination, a main frame; a box forming plunger mounted on said frame for reciprocating movement in a substantially horizontal direction; an open-ended box forming die; means for mounting said die on said frame about a substantially vertically disposed hinge axis for movement from one position in which the die axis coincides with the plunger axis and the plunger may move into and out of the die, into a second position in which the die is swung out of the way of the plunger and the plunger clears the die; a blank feeder comprising a vacuum cup mounted for substantially vertical reciprocating movement between the said die and said plunger, considering the plunger in its retracted position in which it is withdrawn from the die, the vertical stroke of the cup movement being sufficiently long for the cup to move into the path of the end surface of the plunger; stop means for a blank released by said cup for supporting the released blank in a position in which the blank is aligned with said plunger; and power means for operating said plunger and said feeder in timed relationship.

References Cited by the Examiner

UNITED STATES PATENTS

| | | | |
|---|---|---|---|
| 2,832,270 | 4/1958 | Pierce et al. | 93—51 |
| 2,909,105 | 10/1959 | Lawrence | 93—51 |
| 3,102,457 | 9/1963 | Walker | 93—51 |
| 3,192,837 | 7/1965 | Hoyrup et al. | 93—51 |

FOREIGN PATENTS 151,828   12/1937   Austria.

WILLIAM W. DYER, JR., *Primary Examiner.*

JAMES M. MEISTER, *Examiner.*